Dec. 2, 1969   R. H. BLACK   3,481,381
LOCKWASHER
Filed Sept. 5, 1968

INVENTOR
ROBERT H. BLACK

BY Wheeler, Wheeler, House & Clemency
ATTORNEYS

United States Patent Office 3,481,381
Patented Dec. 2, 1969

3,481,381
LOCKWASHER
Robert H. Black, Claremont, Calif. 91711
Continuation-in-part of application Ser. No. 653,831,
July 17, 1967. This application Sept. 5, 1968, Ser.
No. 757,700
Int. Cl. F16b *39/28;* B23g *1/00*
U.S. Cl. 151—35                                            1 Claim

ABSTRACT OF THE DISCLOSURE

The lockwasher comprises a ring preferably made of sheet metal but optionally of molded plastic. The washer has one or more pierce-punched tubular bosses projecting at right angles from each of its opposed faces and having great strength by reason of the fact that the tube is at least internally cylindrical at its tip and has its conical external base surface convergent to its conical internal base surface as the tip is approached. The tips preferably provide axially directed raw edges for engagement with work pressed toward said faces.

BACKGROUND OF THE INVENTION

This application is a continuation-in-part of application Ser. No. 653,831, filed July 17, 1967, now abandoned and entitled "Lockwasher."

Prior art lockwashers have either been in the nature of spiral split rings or had tongues of some sort cut into their inner or outer margins. In general, such prior art devices have either lacked recoverability or have severely damaged the parts engaged thereby. Recoverability involves more than the possibility of reuse of the lockwasher. If, for example, a lockwasher has been subjected to pressure of perhaps 600 inch pounds, it should desirably retain at least a substantial torque-resistance even after a nut engaging the lockwasher has turned through 10° or more in a releasing direction. The instant lockwasher having a nut engaging it under 600 inch pounds requires about 450 inch pounds to release it and it will continue to offer very substantial torque resistance which reduces very gradually. At 10° an embodiment of this invention still offers a resistance of 250 inch pounds or more and at 30° it still offers over 100 inch pounds of torque resistance. This compares with a conventional lockwasher which, engaged under 600 inch pounds of torque, after 10° of nut rotation has only a trace of less than 50 inch pounds torque resistance. The figures given have reference to a half inch lockwasher made of .018 inch stock. Moreover, in addition to its increased effectiveness, the washer of the present invention costs much less than the best available competitive device.

SUMMARY OF THE INVENTION

The invention contemplates a ring having tubular bosses with conical bases projecting in annular series alternately from its opposite faces and having a strength reflecting their tubular form, and the fact that the conical inner and outer base surfaces of the tubular boss are convergent toward the tip, at which point the inner surface is cylindrical and of substantial uniform cross section. The bosses have considerable resilience resulting from their conically flared bases, and are adapted by reason of their axially projecting margins to lock securely to work surfaces. The washer is preferably made of sheet metal with the bosses formed by piercing the metal to leave the desired raw edges. It will be described as a sheet metal product but for many purposes the washer may be made of plastic stock, preferably by molding.

DESCRIPTION OF THE PREFERRED EMBODIMENT

Figure 1:
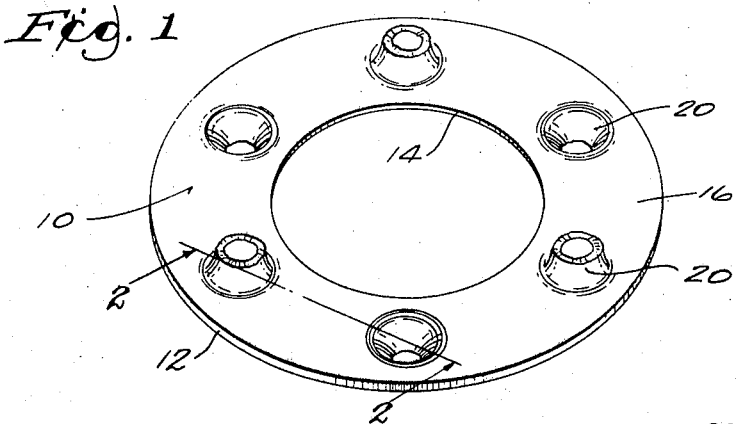
FIG. 1 is a view in perspective of a lockwasher embodying the invention.

The lockwasher illustrated in FIG. 1 has three bosses projecting from each of its faces, the bosses alternating so that the bosses projecting from one face alternate with those projecting from the other. Each boss is normal to the surface of the washer from which it projects. It will be understood that the number of bosses may vary as desired and according to the size of the washer and the gauge of the metal. The height of projection of respective bosses will also vary according to the requirements. Two different heights are illustrated.

The washer comprises a ring having an outer peripheral margin 12 and an inner peripheral margin 14 with opposing faces 16 and 18 which may be relatively flat but are not necessarily so.

Figure 2:
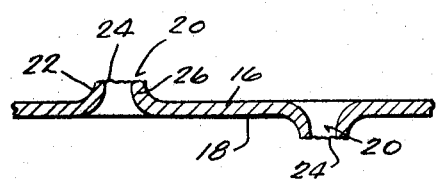
FIG. 2 is an enlarged detail view taken in section on line 2—2 of FIG. 1.
Figure 3:
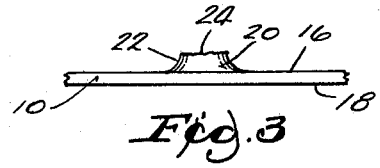
FIG. 3 is a fragmentary detail view in side elevation showing a relatively high pierced boss.
Figure 4:
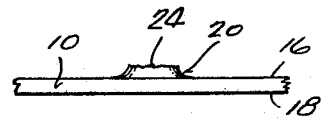
FIG. 4 is a fragmentary detail view similar to FIG. 3 but showing a pierced boss of lesser projection.
Figure 6:
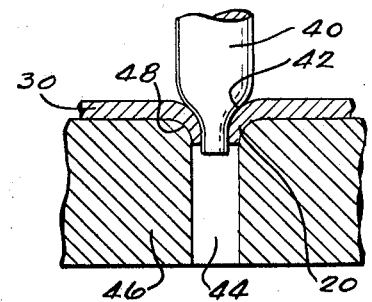
FIG. 6 is an enlarged fragmentary detail view showing a further punching operation which forms a tubular locking boss of conical form and with a conically flaring base.

As best shown in FIG. 2, bosses 20 in annular series project axially and alternately from the faces 16 and 18. Each such boss is tubular with a tip portion of substantially constant cross section and preferably has a conically tapered flaring base portion 22 merging with the face from which the boss projects. Each boss preferably has a cylindrical tip portion 24 having a raw exposed edge for biting into the work. According to the height of the boss which may be relatively great as shown in FIG. 3 or relatively slight as shown in FIG. 4, the wall portion 26 may be reduced progressively in thickness as a result of drawing action during forming. FIG. 6 shows a punch and die which forms a boss to provide an inner surface at the tip which is of uniform cross section in an axial direction, being of substantially constant radius and toward which the outer surface converges to provide the progressive reduction in thickness above mentioned. The axial extent of the cylindrical tip portion 24 can be varied as desired according to the movement of the punch into the die. In any event, the tubular shape with cylindrical tip provides maximum strength in relation to the amount of material used. The curving taper at the base portion 22 gives the boss capacity to yield very substantially without wholly losing its recovery potential. Even in metal which are not regarded as resilient, there is a sufficient degree of resilience so that the washer as here disclosed will yield resiliently to maintain its holding power to much greater extent than any other washer which engages the work with no greater damage to the work than results from the use of this washer.

While the piercing punch as herein disclosed is usually circular in cross section, with the result that the inner surface of the tip 24 of the pierced boss 20 would likewise be circular in cross section, it is desired to emphasize the fact that this is not necessarily the case, since neither the punch nor the boss need be circular to achieve the generally annular form which has the advantages above described.

Figure 5:
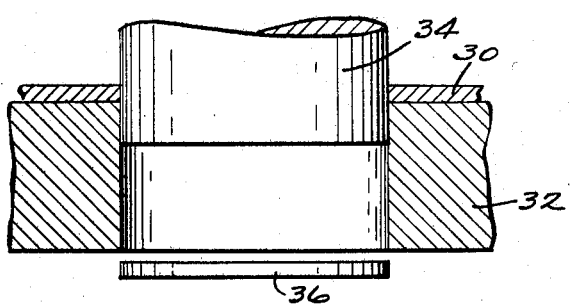
FIG. 5 is an enlarged fragmentary detail view showing the punching operation which removes the center of the washer.

FIGS. 5 and 6 show consecutive steps which may be followed for the production of a single washer embodying the invention. The blank 30 placed on an apertured die 32 is engaged by a punch 34 which passes through the blank to discharge a waste disk 36. In the step shown in FIG. 6, a piercing punch 40, conically tapered at 42, has passed through the blank 30 to form the boss 20 as above described. It is not essential, but it is preferred, that the opening 44 in the die portion 46 have a rounded taper at 48 complementary to the shoulder 42 of punch 40.

The procedural steps illustrated in FIGS. 5 and 6 are, of course, over-simplified. Usually, many washers will be stamped concurrently. Because the outer and inner peripheral margins 12 and 14 are preferably circular and free of projections, it is easily possible to salvage waste by making a smaller washer concurrently with the making of a larger washer, using, in each case, the disk 36 which would normally be wasted, until the waste pieces get too small to be serviceable as washers.

In use, the edges at the tips 24 of the tubular bosses bite readily into the nut and the work with which the washer is engaged. The tapered form of the bases of such bosses permits each boss to yield slightly under high pressure, the yielding being sufficiently resilient so that the washer continues to be effective throughout a very substantial arc of releasing movement of the nut providing such pressure.

I claim:

1. A lockwasher comprising a ring having inner and outer margins and face portions between said margins and provided in its face portions with tubular bosses angularly spaced and alternately projecting oppositely normal to the face portions, each of said bosses having a tip portion with an annular edge having a raw rough margin, each tip portion having adjacent said edge an extremity of substantial axial length and substantially uniform radius and substantially uniform thickness, the said bosses having base portions in which the inner and outer surfaces are both conical and converge arcuately in approaching the tip portions, said inner surface of each boss defining a bore therethrough, said bore being cylindrical at said tip portion, whereby the material of each boss is progressively reduced in thickness toward the tip portion but is of substantially uniform thickness and radius at the tip portion extremity to engage work with a high degree of strength because of its axial direction and low moment, the said base portion providing resilience.

References Cited

UNITED STATES PATENTS 2,069,402   2/1937   Cowlin _____ 151—35
2,179,575   11/1939   Hosking _____ 151—35

EDWARD C. ALLEN, Primary Examiner

U.S. Cl. X.R.

10—86